Nov. 16, 1965 J. H. CUTLER ETAL 3,218,567

MULTIPLE-STAGE SIGNAL TRANSLATION APPARATUS INCLUDING TRANSFORMER COUPLING AND A BRIDGE CIRCUIT

Filed Sept. 25, 1962

INVENTORS
HAROLD H. BRITTEN, (INCOMPETENT)
BY J. B. STOMBOCK, (HIS COMMITTEE.)
JOHN H. CUTLER
BY Robert R Strack
ATTORNEY United States Patent Office 3,218,567

Patented Nov. 16, 1965

3,218,567

MULTIPLE-STAGE SIGNAL TRANSLATION APPARATUS INCLUDING TRANSFORMER COUPLING AND A BRIDGE CIRCUIT

John H. Cutler, Waynesboro, Va., and Harold H. Britten, incompetent, Waynesboro, Va., by J. B. Stombock, committee, Waynesboro, Va., assignors to General Electric Company, a corporation of New York Filed Sept. 25, 1962, Ser. No. 226,488
8 Claims. (Cl. 330—18)

This invention relates to amplifying circuits and particularly, to multiple-stage amplifying circuits.

In the design of amplification circuitry for use in particular applications, the selection of the most appropriate type of circuit is based upon a number of factors. Among these factors are: the amount of gain required; the compatibility of the amplifying circuitry with other circuits in the system; the operating efficiency of the amplifier; and the cost and reliability thereof. Obviously, these factors are generally interrelated and the type of amplifying circuit ultimately designed will be a compromise to obtain the optimum combination of characteristics.

The instant invention is directed toward amplifying circuits that employ individual amplifying elements having a voltage rating that is below the magnitude of the voltage supply. Obviously, if such amplifying elements are directly connected across the voltage supply, either they will operate unsatisfactorily, or they will be damaged and not operate at all. A common technique for using low rated amplifying elements with high supply voltages, is to serially connect several of the elements across the supply. In suitably balanced circuits, the voltage is distributed across the elements and each element experiences only a fraction of the total voltage. In practice it has been found that bridge amplifying circuits yield well balanced high power amplification, and that they are adaptable to operation with power supplies which exceed the rating of the individual amplifying elements in the arms of the bridge. A negative factor inherent in bridge amplifiers, however, is that four active amplifying elements are required for each stage of amplification.

An object of the present invention is to provide improved amplifying circuits for use with supply voltages which exceed the rating of the individual amplifying elements employed in the circuits.

Another object of the invention is to provide improved multiple-stage amplifying circuits having fewer active amplifying elements than comparable multiple-stage bridge amplifiers.

Not in frequently, power amplifying circuits of the nature contemplated form an integral part of voltage regulating circuits, inverters, motor or generator control circuits, and the like. This being the case, it is advantageous to utilize the circuits as functioning subcircuits that furnish control indicia that will permit performance of several operations. For example, in one illustrative embodiment of the invention, the basic amplifying circuitry is used in cooperation with a regulating circuit to furnish a discrete signal indicative of variations of a direct current supply. In this embodiment, the amplifying circuit acts as a low impedance voltage divider with small losses.

Accordingly, another object of the invention is to provide a sensitive voltage sensing circuit including a high gain driving means for use in controlling additional stages.

The invention is illustrated by embodiments comprising a multiple-stage transformer coupled transistor amplifier. The first stage comprises a pair of amplifying elements which alternately energize the primary winding of a coupling transformer. The second stage comprises a bridge amplifier controlled in accordance with the excitation of the coupling transformer to energize the primary winding of an output transformer. Operating power is suppied to the first stage by means of a connection between taps on the primary windings of the coupling and output transformers. Thus, in operation, the individual amplifying elements in the first stage are subjected to a supply voltage which is less than the total supply voltage and which is determined by the position of the taps on the respective primary windings.

Another aspect of the invention is illustrated by an embodiment wherein the voltage appearing on the taps of the aforementioned primary windings is compared with a reference level. When a difference exists between the tap voltage and the reference level, a signal is generated. The generated signal is thus used as a distinct indication of departure of the basic direct current supply from a predetermined value.

The novel features of the invention are set forth with particularity in the appended claims. The invention itself, however, both as to its organization and method of operation, together with further objects and advantages thereof, may best be understood by reference to the following description taken in conjunction with the accompanying drawings wherein:

Figure 1:
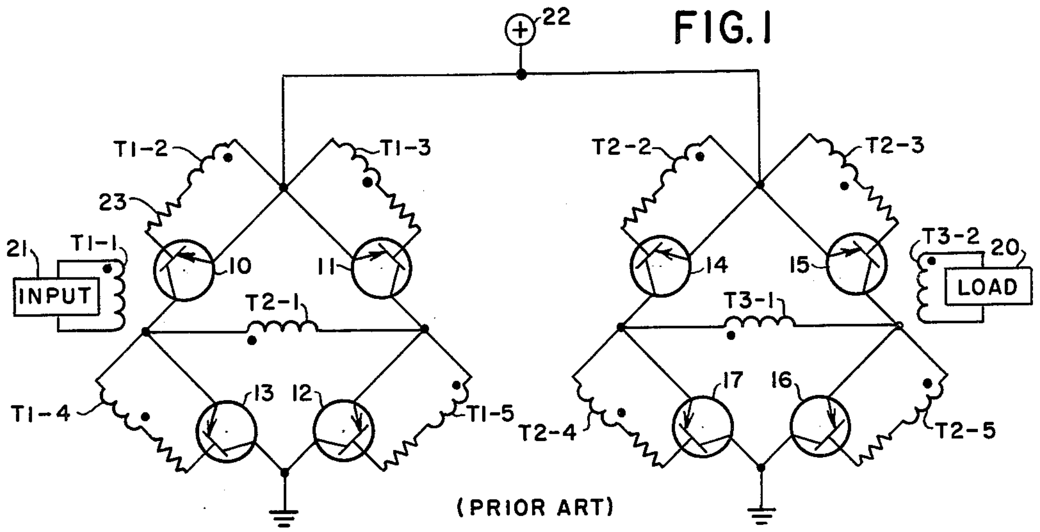
FIGURE 1 is a circuit schematic of a typical prior art two-stage bridge amplifying circuit.

Before proceeding with a consideration of the structure and operation of the illustrated circuits, the element designations used will be explained. For convenience and simplicity, transformer windings are drawn adjacent to the circuit elements with which they function. To identify individual transformers, the designating notations are made up of two parts; the first representing the transformer, and the second representing the winding thereof. For example, transformer winding T1–1 appearing on the left of FIGURE 1 is the primary winding of transformer T1. This transformer has four secondary windings associated with the first stage of the amplifying circuit in FIGURE 1. These secondary windings are designated T1–2, T1–3, T1–4, and T1–5. The conventional "dot" notation is employed to indicate the relationship between each secondary winding and its primary.

Figures 2, 3:
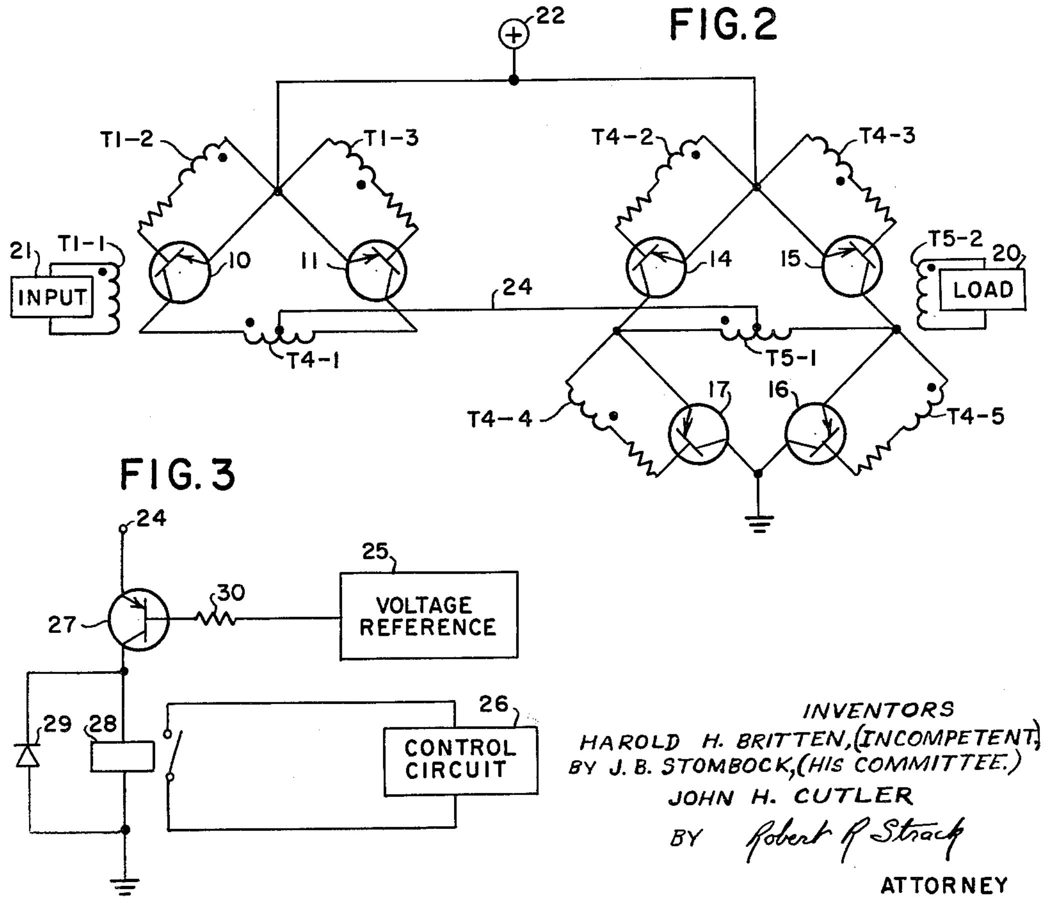
FIGURE 2 is a circuit schematic of an illustrative two-stage amplifying circuit in accordance with the teaching of the present invention.
FIGURE 3 is a partial circuit schematic showing the use of the invention as a sensitive voltage sensing means.

A preliminary consideration of the typical prior art two-stage bridge amplifying circuit in FIGURE 1 will afford a suitable background for an appreciation of the features of the invention as embodied in the unique circuit of FIGURE 2.

Generally, FIGURE 1 comprises a two-stage bridge amplifier interconnected between an input signal source 21 and an output load 20. For purposes of discussion, signal source 21 is considered to produce a rectangular wave; however, the invention is not limited to this particular form of input. A transformer T1 couples input 21 to the first stage of the amplifying circuit. A coupling transformer T2 couples the first and second stages, and an output transformer T3 couples the second stage to load 20.

The two stages of the illustrated amplifier are identical. The first stage, which is typical, comprises PNP transistors 10, 13 and 11, 12 arranged in series-connected pairs across a source of voltage depicted as a positive source 22 and ground. Each series-connected pair has the emitter of a first transistor, 10 or 11, connected to source 22, and the collector of a second transistor 13 or 12, connected to ground. Transistor pair 10, 13 is formed with the collector of the former connected to the emitter of the latter. Similarly, transistor pair 11, 12 is formed with the collector of the former connected to the emitter of the latter.

The conduction of the individual transistors 10, 11, 12, and 13 in each branch of the first stage bridge is controlled by an individual secondary winding T1–2, T1–3, T1–5, and T1–4 of input transformer T1. The specific control circuit in each case is connected between the emitter and base of its associated transistor. For example, transistor 10 is controlled by the series circuit comprising resistor 23 and secondary T1-2 connected between its base and emitter. Also, the secondary windings are arranged to render the transistors in opposite branches of the bridge conductive in response to the same polarity of input signal. Thus, transistors 10 and 12 are rendered conductive in response to a positive polarity input and transistors 11 and 13 are rendered conductive in response to a negative polarity input.

The output from the first amplifying stage is coupled to the second amplifying stage by means of transformer T2. The primary T2–1 interconnects the intermediate junctions of each of transistor pairs 10, 13 and 11, 12 and therefore receives current flow of opposite direction in response to input signals of opposite polarities. Because the second amplifying stage is essentially identical to the first, the coupling transformer T2 functions as the input transformer for the second stage in the same fashion that input transformer T1 acts for the first stage. This similarity further extends to the output transformer T3 which supplies load 20, or if desired, another amplifying stage.

During a typical cycle of operation, the positive half cycle of voltage applied to the dotted terminal of primary T1–1 is effective to render transistors 10 and 12 conductive. In response to this conduction, a current path is provided from positive terminal 22 to ground, which includes transistor 10, primary T2–1, and transistor 12. The resulting current in primary T2–1 induces a voltage in the secondary windings of transformer T2 which renders transistors 14 and 16 conductive. This causes current to flow in primary T3–1 of the output transformer and consequently results in amplified power being supplied to load 20 via secondary T3–2.

The negative half cycle of input power is similarly effective, and initiates conduction of transistors 11, 13, 15, and 17 in order to supply power to load 20; this second application of power being of opposite polarity from that delivered in response to the positive half cycle of the input signal.

It should be noted that at all times the maximum voltage applied across any one transistor amplifying element will be equal to no more than half of the total voltage appearing between source 22 and ground. In view of this fact, economical amplifying elements may be chosen having voltage ratings equivalent to approximately half the supply voltage.

The present invention retains the advantages of the multiple-stage bridge amplifier; but does so with fewer components. In FIGURE 2 the invention has been illustrated in a manner to show its similarity to the typical prior art circuit in FIGURE 1. Accordingly, similar elements have been given similar designations in each figure.

The circuit in FIGURE 2 differs from its predecessor by the elimination of transistors 12 and 13 and their associated control circuits, and, by the inclusion of transformers T4 and T5 having center-tapped primary windings interconnected by a conductor 24. This improved circuit provides amplification equivalent to that obtained by more complicated prior art circuits and at the same time permits use of relatively low voltage rated amplifier elements.

During the initial portion of the positive half cycle from input 21, transistor 10 is rendered conductive and provides a current path between source 22 and ground. This current path comprises: the emitter-collector path of transistor 10, the left portion of transformer primary T4–1, conductor 24, both halves of transformer primary T5–1, and the emitter-collector paths of transistors 16 and 17, in parallel. Shortly thereafter, the current flow through the left portion of primary T4–1 induces sufficient current in secondary windings T4–2 and T4–5 to render transistors 14 and 16 conductive. For the remainder of the positive half cycle, two current paths are available between source 22 and ground. The first path comprises the emitter-collector path of transistor 10, the left half of transformer primary T4–1, conductor 24, the right portion of transformer primary T5–1, the emitter-collector path of transistor 16 and ground. The second path comprises the emitter-collector path of transistor 14, the entire primary winding T5–1, and transistor 16. Obviously, the current flow in output transformer primary T5–1 induces current in secondary T5–2 which supplies the amplified power to load 20.

During a negative half cycle from input 21, a similar series of circuit operations occur causing transistors 11, 15, and 17 to assume a conducting state. Under these conditions, because the current flow through transformer primary T5–1 is into the undotted terminal, the amplified voltage applied to load 20 by secondary winding T5–2 is of opposite sense from that of the first half cycle.

Thus, in operation of the circuit shown in FIGURE 2, the entire voltage of source 22 is never applied across transistors 10 or 11 even although the first stage does not consist of a full bridge circuit. By interconnecting the primaries of the coupling transformer T4 and output transformer T5, the actual voltage supplied to the first stage of the amplifier is only a portion of the total supply voltage. The particular fraction of the total voltage appearing across the first stage is determined by the actual position of the taps on the transformer primaries and in order to avoid an alternating component of voltage between conductor 24 and ground, the transformer primaries are center-tapped. Thus, the voltage between conductor 24 and ground is equal to one-half the total voltage between supply 22 and ground.

FIGURE 3 shows an embodiment of the invention wherein a control circuit 26 receives a discrete indication when the voltage at a particular point 24 exceeds a reference level established by a voltage reference circuit 25. Actually, point 24 represents a connection to conductor 24 in FIGURE 2 and consequently, the unique arrangement of FIGURE 2 is contemplated to supply the driving force which will effect the indication supplied to control circuit 26. Voltage reference 25 may take any of the many forms known to the art for developing a stable reference of desired magnitude.

The circuit in FIGURE 3 comprises a PNP transistor 27 connected in series with a relay 28 between point 24 and ground, and a diode 29 connected across relay 28 to reduce the inductive effects of the winding thereof. The base of transistor 27 is connected by a resistor 30 to voltage reference circuit 25 in order to be forward-biased when the voltage at point 24 exceeds the reference potential. Upon conduction of transistor 27 in response to forward-biasing, relay 28 is energized and closes its normally open contacts. These contacts are connected across control circuit 26 and therefore supply a discrete indication of the relationship between the voltage of point 24 and reference 25.

Because point 24 is actually conductor 24 in FIGURE 2, the amplifiers of FIGURE 2 act as a low impedance voltage divider between source 22 and ground. The amplifiers provide a high gain driving circuit for relay 28 and in many applications, the additional action of transistor 27 is not even required.

Of course, modifications may be made in the illustrative embodiments without departing from the spirit and scope of the invention. For example, the tap on output transformer primary T5–1 may be more positively maintained at a selected fraction of the supply voltage by interconnecting a voltage divider between source 22 and ground with a tap connected to primary winding T5–1. Furthermore, a by-pass capacitor may be inserted between the tap on primary T5–1 and ground, in order to eliminate ripple effects.

The described circuits constitute particular embodiments of the invention. It will, of course, be understood that it is not wished to be limited thereto since many modifications can be made both in the circuit arrangement and in the instrumentalities employed and it is contemplated in the appended claims to cover any such modifications as fall within the true spirit and scope of the invention.

What is claimed as new and desired to be secured by Letters Patent of the United States is:

1. A two stage amplifier comprising, a first transformer coupling the output of the first stage of said amplifier to the input of the second stage of said amplifier, a second transformer connected to the output of said second stage, a source of unidirectional potential having two terminals, means connecting said source of unidirectional potential across said second stage, means connecting one terminal of said source of unidirectional potential to said first stage, and conducting means interconnecting the primary windings of said first and second transformers to provide a series current path through a portion of the primary winding of said output transformer of said first stage and a portion of the primary winding of said output transformer of said second stage between the terminals of said source of unidirectional potential.

2. A two stage amplifier as defined in claim 1 wherein said first stage comprises, a pair of transistors having their emitters connected to said one terminal of said source of unidirectional potential and their collectors connected to opposite ends of the primary winding of said first transformer; and wherein said second stage comprises, two series connected pairs of transistors connected between said terminals of said source of unidirectional potential, each transistor having input connections including its respective base electrode, each series connected pair being interconnected with the emitter of one transistor connected to the collector of its associated transistor, the primary winding of said second transformer being connected between the emitter-collector junctions of said series connected pair of transistors.

3. A two stage amplifier as defined in claim 2 wherein said conducting means interconnects points on each of said primary windings substantially midway between either end thereof.

4. A two stage amplifier comprising, a transformer coupling the output of the first stage of said amplifier to the input of the second stage of said amplifier, a voltage divider connected to the output of said second stage, a source of unidirectional potential having two terminals, means connecting said source of unidirectional potential across said second stage, means connecting one terminal of said source of unidirectional potential to said first stage, and conducting means interconnecting the center of the primary winding of said transformer to the center of said voltage divider, to provide a series current path through a portion of the output voltage divider of said first stage and a portion of the output voltage divider of said second stage between the terminals of said source of unidirectional potential.

5. A voltage responsive circuit comprising, first and second amplifying stages, a transformer coupling the output of said first stage to the input of said second stage, a voltage divider connected to the output of said second stage, a source of unidirectional potential having two terminals, means connecting said source of unidirectional potential across said second stage, means connecting one terminal of said source of unidirectional potential to said first stage, conducting means interconnecting the center of the primary winding of said transformer to the center of said voltage divider, to provide a series current path through a portion of the output voltage divider of said first state and a portion of the output voltage divider of said second stage between the terminals of said source of unidirectional potential, a source of reference potential, and indicating means connected between said conducting means and the other terminal of said unidirectional source of potential and controlled by said reference potential to yield a discrete indication when the voltage on said conducting means exceeds the magnitude of said reference potential.

6. An amplifying circuit for alternating polarity input signals comprising, a coupling transformer having a center-tapped primary winding and a plurality of secondary windings, a source of unidirectional potential, a pair of amplifying elements connected between one terminal of said source of unidirectional potential and opposite ends of the primary winding of said coupling transformer, means for rendering conductive each of said amplifying elements in response to opposite polarities of said input signals, a plurality of amplifying elements connected in a bridge with said source of unidirectional potential connected across one diagonal thereof, the amplifying elements in opposite branches of said bridge having input connections including said plurality of secondary windings so as to be rendered conductive in response to voltage of a particular polarity induced in said secondary windings, an output transformer having a center-tapped primary winding connected across the other diagonal of said bridge and a secondary winding, and means interconnecting the center taps on said transformer primary windings.

7. A circuit comprising, means for generating alternating polarity signals, a coupling transformer having a center-tapped primary winding and a plurality of secondary windings, a source of unidirectional potential, a a pair of amplifying elements connected between one terminal of said source of unidirectional potential and opposite ends of the primary winding of said coupling transformer, means for rendering conductive each of said amplifying elements in response to opposite polarities of said input signals, a plurality of amplifying elements connected in a bridge with said source of unidirectional potential connected across one diagonal thereof, the amplifying elements in opposite branches of said bridge having input connections including said plurality of secondary windings so as to be rendered conductive in response to voltage of a particular polarity induced in said secondary windings, an output transformer having a center-tappped primary winding connected across the other diagonal of said bridge and a secondary winding, conducting means interconnecting the center taps on said transformer primary windings, a source of reference potential, and switching means connected to said conducting means and said source of reference potential and operative to yield a discrete indication when the voltage on said conducting means exceeds the voltage of said reference potential.

8. An amplifying circuit for alternating polarity input signals comprising, a coupling transformer having a center-tapped primary winding and a plurality of secondary windings, a source of unidirectional potential having two terminals, a pair of transistors having their respective emitter-collector paths connected between one terminal of said source of unidirectional potential and opposite ends of the primary winding of said coupling transformer, means operative in response to said input signals for rendering one of said transistors conductive for each polarity of said input signals, a transistor bridge comprising two pairs of series connected transistors connected in parallel between the terminals of said source of unidirectional potential, each transistor in said bridge having input connections including its respective base electrode and an assocated coupling transformer secondary winding, an output transformer having a center-tapped primary winding connected between the junction points intermediate the series connected transistors of each of said series connected pair and a secondary winding, and conducting means connecting the center taps of said transformer primary windings.

References Cited by the Examiner

UNITED STATES PATENTS

| | | | |
|---|---|---|---|
| 2,048,528 | 7/1936 | Wheeler | 330—154 X |
| 2,093,393 | 9/1937 | Jarvis | 330—154 X |
| 2,910,689 | 10/1959 | Grace | 330—15 X |
| 2,965,833 | 12/1960 | Jensen. | |
| 2,982,887 | 5/1961 | Seeley | 328—148 X |

ROY LAKE, *Primary Examiner.*

NATHAN KAUFMAN, *Examiner.*